United States Patent Office 3,153,861
Patented Oct. 27, 1964

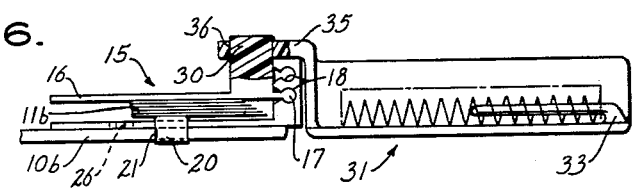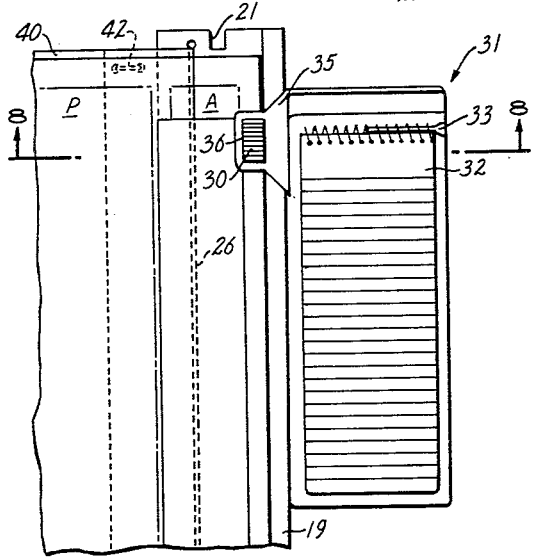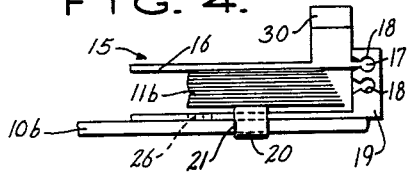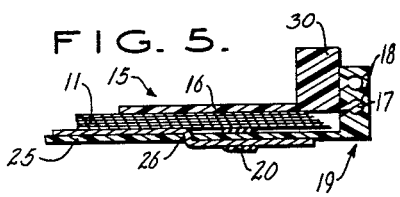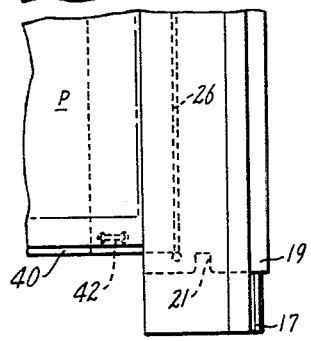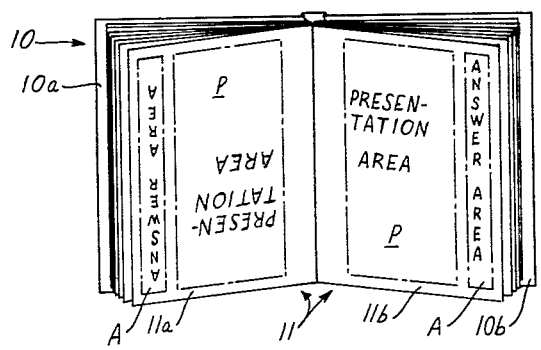

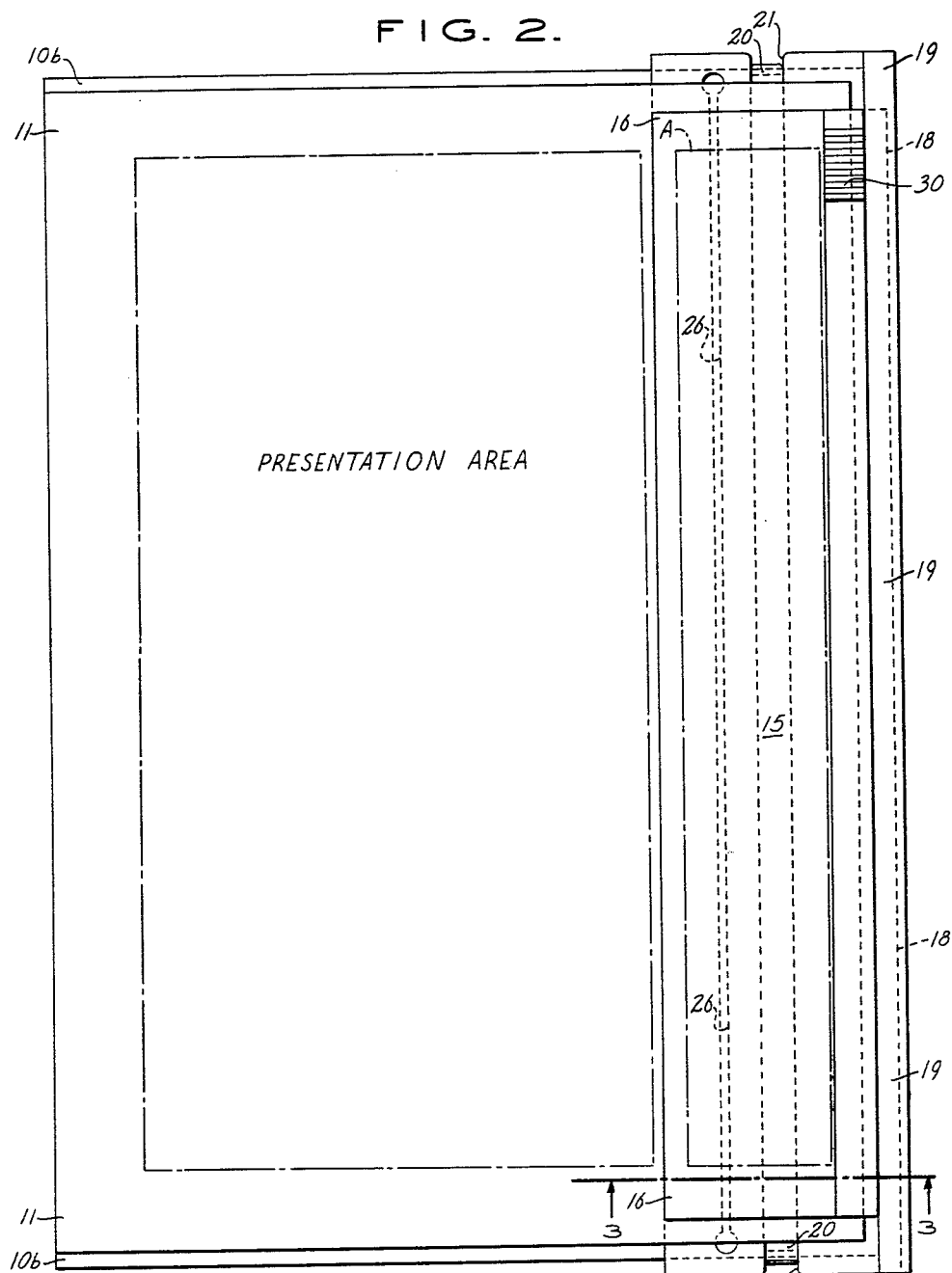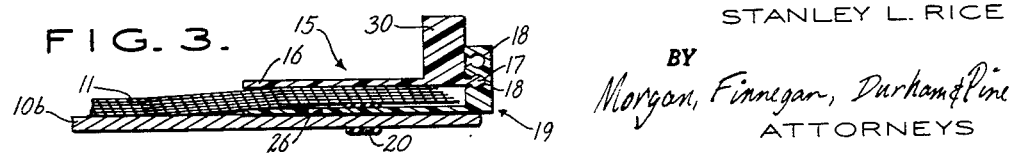

3,153,861
TEACHING AIDS
Stanley L. Rice, 41 W. 96th St., New York 25, N.Y.
Filed Apr. 28, 1961, Ser. No. 106,373
6 Claims. (Cl. 35—9)

This invention relates to teaching materials of the type concerned with the ordered, sequential development of subject matter such as characterizes programmed-type teaching aids and teaching machines and continuous-discourse type teaching techniques. More particularly the invention concerns teaching materials in which means are provided for selectively presenting and evaluating subject responses to such ordered and sequenced stimuli.

Various arrangements have been proposed for facilitating subjective evaluation of student responses. Thus various proposals have been made for supplying a student with testing materials which have concealed in some suitable fashion therein the correct responses to the questions or exercises presented. In one form the correct answers are disclosed on a sheet which is masked by the examination sheet and secured thereto in such a manner that the student's attempt to separate the two prematurely will be readily detected.

These and other forms of evaluating devices are burdened with a number of shortcomings and disadvantages. In many cases the means for initially concealing the correct responses are suitable for use with but one examination paper. Further, the examination paper must be especially constructed. In many forms special cutouts, transparencies and the like must be embodied in the examination papers themselves. Moreover, in the vast majority of these arrangements all of the responses on a particular sheet are simultaneously exposed, thus increasing the chance of a mistake in the evaluating operation. In still other arrangements, elaborate folding and other manipulations of the examination material are required in order to provide the checking feature. Further, these known arrangements are designed solely with the formal type of testing in mind. As such, they do not lend themselves to the ordered sequence of presentation suggested by psychological factors of learning. These factors dictate the need for carefully designed sequences so that reinforcement, for example, and other desirable effects are realized. Prior art techniques largely ignore sequence of exposure. The responses in such arrangements may be exposed simultaneously, haphazardly or arbitrarily, and may depend entirely on how the student removes the concealing means.

It is thus an object of the invention to provide improved means for enabling a student to evaluate his responses to a set of stimuli such as interrogatories or incomplete statements, in an ordered, sequential manner.

An additional object of the invention is to provide such means which may provide self-checking of a plurality of sequences presented on a plurality of pages, for example in book form.

A still further object of the invention is to provide teaching aids for presenting programmed material including stimuli and for indicating the correct responses to said stimuli in predetermined sequence, e.g., serially, rather than simultaneously.

A still further object of the invention is to provide such teaching aids which may comprise a self-contained set of materials for presenting subject matter in predetermined sequence, for presenting related testing matter and for providing correct responses thereto which become accessible to the student sequentially.

A still further object of the invention is to provide a teaching aid in book or booklet form having material therein prepared according to the "continuous discourse" or "programmed type" teaching techniques, said book including a self-checking mechanism for initially concealing and sequentially exposing correct responses sought of the student, said self-checking mechanism being adjustable in several planes to permit its use in varied sections of said book.

Other objects of the invention are to provide a self-checking mechanism adapted for releasable connection with a book and adjustment with respect thereto and a self-checking mechanism which is adapted for connection with a booklet or other soft-cover publication having teaching materials of the "programmed type" therein.

These and other objects and advantages of the invention will be set forth in part hereinafter and in part will be obvious herefrom, or may be learned by practice with the invention, the same being realized and attained by means of the instrumentalities and combinations pointed out in the appended claims.

Briefly and generally the invention comprises answer disclosing means adjustably coupled to means for holding teaching materials and adapted to serially disclose the correct or standard responses to sections of said material which require student responses.

The invention consists in the novel parts, constructions, arrangements, combinations and improvements herein shown and described.

Serving as illustrations of exemplary embodiments of the invention are the drawings, of which:

FIGURE 1 is a perspective view of a book providing a programmed-type presentation which includes teaching materials and a listing of correct responses;

FIGURE 2 is a plan fragmentary view of the book of FIGURE 1 with the self-checking mechanism of the invention coupled thereto;

FIGURE 3 is a view taken along the lines 3—3 of FIGURE 2;

FIGURE 4 is an elevation fragmentary view illustrating the answer disclosing or self-checking means in one assembled form with the book of FIGURES 1-3;

FIGURE 5 is an elevation fragmentary view in cross-section of a modification illustrating an alternate form of connection between the self-checking means and a presentation book having a flexible cover;

FIGURE 6 is an elevation fragmentary view in section illustrating a convenient pad attachment to the self-checking means;

FIGURE 7 is a plan view partly fragmentary of an alternate form of connection between a flexible cover presentation book and the self-checking means; and FIGURE 8 is an enlarged view taken along the lines 8—8 of FIGURE 7.

As illustrated in FIGURE 1, the teaching aids according to the invention are designed to function with presentation materials which in a typical arrangement may comprise a book 10 having a front cover 10a, a rear cover 10b and pages 11 temporarily or permanently bound therebetween. Each of the pages 11 may include a presentation area P occupying the central section thereof and an answer area, A, adjacent section P along the distal margin of each page. For reasons which will become clear hereinafter, opposing pages 11a and 11b are relatively inverted. Book 10 is therefore inverted when the materials on the pages 11a are being presented.

The presentation area P in a typical embodiment comprises a programmed presentation of subject matter which may include actual affirmative discourse together with incomplete statements designed to elicit certain responses from the students. The correct responses are arranged adjacent the point of elicitation, in the answer area. Typical presentations might take the following form:

| Statement | Response |
|---|---|
| "Reflexes can best be studied when they are induced by a stimulus that is controlled by the experimenter, and when the resulting reflex action is carefully observed and recorded. In the case of a frog, for example, a blinking reflex is produced by a probe which acts as the instrument for applying the ―――――." | "Stimulus." |
| "Touching a frog's nostrils is another form of stimulus which induces a ―――――― action in the frog's nose." | "Reflex." |

The correct responses listed in the answer area A are initially concealed by the self-checking arrangement of the invention such as illustrated in FIGURES 2 and 3. As seen therein, the answer section A is initially concealed by masking means 15 having a plane strip section 16 which overlays answer section A, and coupling and guiding means comprising an integral key 17 which is slidably disposed in one of a plurality of keyways 18 in a carrier member 19. Mask 15 may thus be displaced longitudinally of the carrier, cover and pages thereby successively revealing the correct responses disposed in column A. The carrier 19, comprising a strip and keyed integral flange, is adjustably coupled to cover 10b by means of an elastic member 20 which circumscribes the carrier strip and the cover on which the strip lies. Notches 21 are conveniently provided in the carrier 19 for positioning the elastic member 20. The distal margins of pages 11 are inserted between the carrier and masking member. As evident in the figures, carrier 19 may be adjusted laterally of the cover. This adjustment provides the resultant adjustment of masking means 15 to insure that the latter completely covers the answer area A without obscuring presentation area, P, of the pages 11. To accommodate the varying number of pages disposed between carrier 19 and masking means 15, the latter may be positioned in either of the plurality of keyways 18 (compare FIGURES 3 and 4). The self-checking arrangement is accordingly adjustable in a plurality of planes to adapt it to any configuration of the pages 11b. For presentations involving pages 11a, the self-checking arrangement may be removed from cover 10b, inverted and attached to cover 10a.

Where the covers of book 10 are of the flexible type, connection to the self-checking arrangement may be provided as shown in FIGURE 5, where a flexible cover 25 is routed through a slot 26 provided in carrier 19. The cover 25 is adjustably clamped to the carrier, as in the embodiment of FIGURES 1 to 4, by means of the elastic member 20.

Masking means 15 is also provided with an integral lug 30 which projects upwardly from the plane section 16. Lug 30 facilitates the slidable adjustments of masking means 15 in carrier 19. Lug 30 is adapted to receive and releasably hold a record carrier 31 (FIGURES 6 to 8) which may hold, for example, a pad 32 or other record device on which the student may record his answers or notes. Pad 32 is conveniently secured to record carrier 31 by means of a clip 33 on the latter. The spiral binding of the pad may be inserted on the clip as shown in FIGURES 6 and 7. Alternatively, clip 33 may comprise a resilient blade under which the notebook 32 is clamped. An integral arm extension 35 on record carrier 31 includes a bore 36 into which is received lug 30 of masking means 15.

An alternate method of connecting the self-checking means to the presentation material is illustrated in FIGURES 7 and 8, wherein flexible cover 40 is inserted through slot 26 in carrier 19, folded back on itself and connected as by a snap fastener or, as illustrated, staples 42. It may be be seen from the above that the self-checking arrangement is adapted for connection to virtually any cover configuration, may be effectively employed with both sides of each page in the presentation booklet, and may be adjusted relative to the presentation material to accommodate changes in page number and position.

In operation the self-checking structure is connected to the presentation book as described above. The student studies the presentation area, arriving at points where a question is posed either expressly or impliedly as by means of an incomplete statement. After the student has formulated a response, it may be checked by sliding masking member 15 longitudinally in carrier 19 until the correct response is disclosed in answer area A. Prior to this, some applications may require that the student record his answer either in blank sections provided in the presentation area or in an adjacent column, or on notebook 32. In either event, the student is provided with a self-checking arrangement which enables him to test his acquisition and retention of the subject matter in controlled sequence. The procedure described above is repeated until all responses on a particular page have been elicited and checked. This page is then withdrawn from beneath the masking member 15 by a simple turning motion and rotated to the opposite side of the book. A new page is then ready for use. As the number of pages is depleted masking member 15 may be withdrawn from the carrier 19 and re-installed in lower keyway 18. In addition, carrier 19 may be adjusted laterally to keep the masking member 15 in complete overlapping arrangement with respect to answer area A but without obscuring any of the presentation material. After one set of pages has been thus employed, the self-checking arrangement may be placed on the other cover of the book and the material on opposing pages presented.

While one basic embodiment has been shown, modifications will occur to those skilled in the art. Thus the invention in its broader aspects is not limited to the specific mechanisms shown and described but departures may be made therefrom within the scope of the accompanying claims without departing from the principles of the invention and without sacrificing its chief advantages.

What is claimed is:

1. A testing arrangement adapted for programmed teaching procedures in conjunction with a covered book having a plurality of pages depicting means for evoking responses and means for representing correct responses comprising carrier means including resilient means for releasably and adjustably clamping said carrier means to the cover of said book and key means, slidable masking means in sliding engagement with said key means, said masking means being oriented in overlapping arrangement relative to the regions of said pages wherein said correct response representations are located whereby movement of said masking means exposes sequentially said correct response representations, said masking means being engaged to said carrier means to permit substantially unrestrained displacement of selected of said pages from beneath said masking means whereby said sequential exposure of responses may be repeated for other of said pages.

2. An arrangement as set forth in claim 1 in which said carrier means include a slot adapted to receive the corner of said book.

3. A teaching aid for sequentially presenting stimuli to a student and for checking the responses thereto comprising a plurality of pages having said stimuli represented thereon and the correct responses thereto, a cover for said pages, a member including coupling means and connecting means, said connecting means including resilient means and being adapted to adjustably and releasably connect said member to said cover, slidable masking means connected in slidable relation to said coupling means of said member and oriented to overlap said correct responses on said pages whereby movement of said masking means selectively discloses said responses, said masking means being in spaced relationship with respect to said member to provide a substantially unrestricted space for certain of said pages whereby they may be readily positioned beneath and removed from under said masking means.

4. A teaching aid as set forth in claim 3 in which said coupling means comprise a plurality of channels and said masking means include a longitudinal member adapted for insertion in any of said channels.

5. A teaching aid as set forth in claim 3 including a record carrier, said masking means having connection means to which said record carrier is connected.

6. A teaching aid for sequentially presenting stimuli to a student and for checking the responses thereto comprising a plurality of pages having said stimuli represented thereon and the correct responses thereto, a cover for said pages, a member including coupling means and connecting means, said connecting means being adapted to adjustably and releasably connect said member to said cover, slidable masking means connected in slidable relation to said coupling means of said member and oriented to overlap said correct responses on said pages whereby movement of said masking means selectively discloses said responses, said masking means being in spaced relationship with respect to said member to provide a substantially unrestricted space for certain of said pages whereby they may be readily positioned beneath and removed from under said masking means, and said coupling means including a plurality of guide means each adapted to receive said masking means whereby the position of said masking means relative to said pages may be adjusted.

References Cited in the file of this patent

UNITED STATES PATENTS

| 479,632 | Crane | July 26, 1892 |
| 2,234,075 | Carolin | Mar. 4, 1941 |
| 2,986,822 | Balchuns | June 6, 1961 |
| 3,021,612 | Palmer | Feb. 20, 1962 |
| 3,046,675 | Schure | July 31, 1962 |
| 3,054,195 | Palmer | Sept. 18, 1962 |